United States Patent
Nouchet et al.

(10) Patent No.: US 10,425,805 B2
(45) Date of Patent: Sep. 24, 2019

(54) METHOD FOR RE-INDEXING A TERMINAL IN A COMMUNICATION GATEWAY

(71) Applicant: SAGEMCOM BROADBAND SAS, Rueil Malmaison (FR)

(72) Inventors: Gaëtan Nouchet, Rueil Malmaison (FR); Jean-Philippe Jaulin, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/061,238

(22) PCT Filed: Dec. 13, 2016

(86) PCT No.: PCT/EP2016/080718
§ 371 (c)(1),
(2) Date: Jun. 11, 2018

(87) PCT Pub. No.: WO2017/102679
PCT Pub. Date: Jun. 22, 2017

(65) Prior Publication Data
US 2018/0359630 A1    Dec. 13, 2018

(30) Foreign Application Priority Data

Dec. 14, 2015  (FR) .................................. 15 62327

(51) Int. Cl.
*H04M 1/727* (2006.01)
*H04W 8/22* (2009.01)
(Continued)

(52) U.S. Cl.
CPC .............. *H04W 8/22* (2013.01); *H04M 1/727* (2013.01); *H04W 88/02* (2013.01); *H04W 88/08* (2013.01)

(58) Field of Classification Search
CPC ........... H04M 2250/08; H04M 1/2535; H04M 1/72502; H04M 1/727; H04M 15/06;
(Continued)

(56) References Cited

U.S. PATENT DOCUMENTS 5,054,042 A * 10/1991 Soury .................. H04W 84/02
455/445
2003/0176197 A1 * 9/2003 Chen .................. H04M 1/72502
455/462

(Continued)

FOREIGN PATENT DOCUMENTS

DE            197 40 934 A1    4/1999

OTHER PUBLICATIONS

DE 19740934(A1) Method for registering a handset to a base station and communication system—Apr. 1, 1999 (Year: 1999).*
(Continued)

*Primary Examiner* — Nimesh Patel
(74) *Attorney, Agent, or Firm* — Pillsbury Winthrop Shaw Pittman LLP

(57) ABSTRACT

A method for re-indexing in a base station a first mobile terminal to be associated with a new predefined routing configuration, the base station listing a first set of identifiers of mobile terminals and a set of context identifiers, each context identifier associated with an allocation of lines corresponding to a routing configuration for routing incoming and outgoing communications, the method including detecting a request to change a terminal's identifier, sent by the first terminal, the request including information corresponding to a context identifier listed in the base station; checking that a new terminal identifier associated with the context identifier is available, the context identifier being determined by analyzing the context information of the request; allocating a new terminal identifier to the first
(Continued)

terminal by sending the new terminal identifier to the first terminal and changing the indexing of the new identifier of the terminal stored in the base station.

10 Claims, 3 Drawing Sheets

(51) Int. Cl.
*H04W 88/02* (2009.01)
*H04W 88/08* (2009.01)

(58) Field of Classification Search
CPC ......... H04M 15/8033; H04M 1/72519; H04M 2215/2026; H04M 2215/32; H04M 2215/74; H04M 2215/7435; H04M 3/42229; H04M 3/42246; H04M 3/54; H04M 1/725; H04M 1/72505; H04M 15/75; H04M 15/755; H04M 2207/18; H04M 2207/203; H04M 2215/7222; H04M 2215/7254; H04M 2242/14; H04M 2250/06; H04W 60/00; H04W 84/105; H04W 12/06; H04W 84/16; H04W 48/02; H04W 48/04; H04W 80/00; H04W 88/06; H04W 12/02; H04W 76/10; H04W 80/00; H04W 12/04; H04W 12/08; H04W 74/00; H04W 88/02; H04L 65/1073; H04L 65/1053; H04L 2209/80; H04L 12/2803; H04L 12/2856; H04L 12/4633; H04L 29/06333

See application file for complete search history.

(56) References Cited

U.S. PATENT DOCUMENTS

| | | | |
|---|---|---|---|
| 2005/0059388 A1* | 3/2005 | Haines | H01Q 3/00 455/422.1 |
| 2008/0026745 A1* | 1/2008 | Grubb | H04W 8/245 455/426.1 |
| 2009/0265775 A1* | 10/2009 | Wisely | H04L 63/0492 726/9 |
| 2010/0173627 A1* | 7/2010 | Gustafson | H04W 76/12 455/426.1 |
| 2010/0273453 A1 | 10/2010 | Mikan et al. | |
| 2010/0311408 A1 | 12/2010 | Kehren et al. | |
| 2011/0286443 A1* | 11/2011 | Wu | H04M 1/2535 370/352 |

OTHER PUBLICATIONS

International Search Report as issued in International Patent Application No. PCT/EP2016/080718, dated Jan. 25, 2017.

* cited by examiner

METHOD FOR RE-INDEXING A TERMINAL IN A COMMUNICATION GATEWAY

CROSS-REFERENCE TO RELATED APPLICATIONS

This application is the U.S. National Stage of PCT/EP2016/080718, filed Dec. 13, 2016, which in turn claims priority to French patent application number 1562327 filed Dec. 14, 2015. The content of these applications are incorporated herein by reference in their entireties.

FIELD

The field of the invention is that of the indexing of terminals referenced in a communication gateway, where the gateway provides access to a plurality of telephone lines and routing of communications. More specifically, the field of the invention concerns mobile terminals which are to be recharged in a fixed dock, indexing to the lines of which is performed by a base or the gateway. The field of application of the invention relates to methods for indexing terminals to a routing context and to their re-indexing when it is detected that their use has been modified.

STATE OF THE ART

The DECT standard, which stands for "Digital Enhanced Cordless Telephone", defines the main services for implementing communications for home or professional terminals attached to a base station or a gateway. When they are mobile terminals they are generally associated with a dock. The products therefore consist of a base station and one or more fixed or mobile terminals, more commonly called "handsets".

Standard ETSI EN 300 175 parts 1 to 8 and standard ETSI EN 300 444 describe how the handsets' identifiers are distributed, where these identifiers enable the incoming and outgoing calls and other messages to be directed.

A principle of allocating numbers to terminals when they are associated with a base station is therefore currently known.

Currently, with the known solutions, routing of calls is defined statically within a gateway. For each terminal, represented by its identifier, the user can associate a list of lines for incoming calls, and a default line for outgoing calls.

FIG. 1A represents an example of lines being allocated for incoming calls to a set of known terminals of a gateway. The crosses represent these allocations. For example, two lines $L_1$, $L_N$ are allocated to terminal $T_3$ for incoming calls. According to another example, terminal $T_N$ can receive all the incoming calls since all the lines are allocated to it for incoming calls. It should also be noted that a call on line $L_1$ will cause all handsets $T_1$ to $T_{N+1}$ to ring.

FIG. 1B represents an allocation of a set of terminals to a plurality of lines to configure outgoing calls. On examination of FIG. 1B it will be understood that, for example, terminal $T_2$ is allocated to line $L_3$ for the outgoing calls of terminal $T_2$. In this example a number dialled on terminals $T_1$ or $T_{N+1}$ will activate a call through line $L_1$.

A problem is posed when an terminal is physically moved and is, for example, put back into a dock other than its initial dock. This case can occur when multiple terminals are used in a professional context in buildings in which each user sometimes moves around with its own mobile terminal.

When such an operation occurs a step of manual reconfiguration is performed in the base station, to reallocate a routing configuration, to route to the said terminal. If no such configuration occurs users must find their terminals.

But reconfiguring the base station means that the gateway's configuration interface must be used. And this interface is generally difficult to access, and is not accessible to all users. Furthermore, an uninformed user must generally enlist the assistance of a technician to reconfigure the gateway when a terminal is reallocated to another base.

Finally, for each terminal where allocation has changed it is necessary therefore to remove these old associations before adding the new ones. Reconfiguring such a gateway is difficult to perform when deploying a large number of terminals, despite the fact that the reallocations are common and increasingly frequent, given users' increased mobility.

SUMMARY OF THE INVENTION

The invention enables the above-mentioned disadvantages to be resolved.

One object of the invention concerns a method for re-indexing in a base station at least one first mobile terminal which is to be associated with a new predefined routing configuration, where the base station lists a first set of identifiers of mobile terminals and a set of context identifiers, where each context identifier is associated with an allocation of lines corresponding to a routing configuration for routing incoming and outgoing communications, and where the said method comprises:

A detection of a request to change a terminal's identifier, sent by the first terminal, where the said request comprises information corresponding to a context identifier listed in the base station;

A check that a new terminal identifier associated with the context identifier is available, where the said context identifier is determined by analysing the context information contained in the request;

An allocation of a new terminal identifier to the said first terminal, comprising:
  A sending of the new terminal identifier to the said first terminal;
  A change to the indexing of the new terminal identifier stored in the base station.

According to one implementation the re-indexing method comprises, prior to this step:

A generation of an activating event which causes the first terminal to send a request to change the identifier of a terminal made to the base station, where the activating event is caused by the detection of a change of context of the first terminal.

According to one implementation the base comprises a memory in which a set of specific routing configurations and at least one default routing configuration are stored.

According to one implementation, when the step of checking the availability of a new terminal identifier fails, the method comprises a step of:

Generating a request to modify the terminal identification sent to a second terminal, comprising the terminal identification corresponding to the desired context identification;

Allocating a second terminal identifier to the second terminal, where the said second terminal identifier is allocated to a default routing configuration.

According to one implementation the re-indexing method comprises a sending of a message by the base station to the first terminal, asking it to send a new request to change the terminal identifier after a first time period has elapsed.

According to one implementation, when the step of checking the availability of a new terminal identifier fails, the re-indexing method comprises a step of:

Generating a request to modify the terminal identification sent to a second terminal, comprising the terminal identification corresponding to the desired context identification;

Activating of a second time delay, during which the base station waits for a reply from the second terminal;

Deleting the terminal identification of a second terminal comprising the terminal identification corresponding to the desired context identification in an indexing table of the base station after the second time delay has elapsed.

According to one implementation the context information is one element in the following list:

A dock identifier, when the activating event is a connection of the first terminal to a dock other than the dock with which it has initially been associated;

A user identifier or a code associated with a user account, when the activating event is the entry of a code in an interface of the first terminal or the recognition of a fingerprint;

A location identifier, when the activating event is the association of the first terminal with a predefined location, known to the base station.

Another object of the invention concerns a computer program product comprising a computer and a memory comprising a sequence of instructions which, when the program is executed by a computer, causes this computer to implement the method of the invention. The instructions of the computer program product can be executed on a computer such as a microprocessor or a microcontroller. A memory allows storage of the data to be recorded, such as that of the database comprising the identifiers or the line numbers and the allocations and re-indexing operations.

Another aspect of the invention relates to a computer-readable recording medium on which the computer program product according to the invention is recorded. This aspect of the invention relates in particular to a recording medium which is readable by a terminal or a base station, on which medium the computer program product according to the invention is recorded.

Another object of the invention concerns a base station comprising computation means of the communications interfaces enabling incoming calls to be received and transmitted, a radio interface enabling messages to be sent to and received from multiple terminals referenced in a memory, where the said memory stores data referencing:

mobile terminal identifiers associated with context identifiers;

line identifiers enabling routing configurations to be defined when they are associated with terminals, where the said base station comprises a configuration table for the routing of incoming and outgoing calls associating each context identifier with a predefined routing configuration, where the said base station also comprises a function enabling a request to change a terminal identifier which has been sent by a terminal to be detected, a determination of context information comprised in the said request enabling a new terminal identifier associated with a context identifier corresponding to the information extracted from the received message to be identified, and an allocation of the new terminal identifier to the said terminal which made the request for change.

The base station comprises the means to implement the steps described below of the method of the invention, which are executed by the said base station.

Another object of the invention concerns a terminal comprising an immutable physical address and an interface enabling a contextual element relating to a new use of the said terminal to be determined, and computation means enabling a message intended to be sent to a base station transmitted by radio to be generated, where the said message comprises:

information identifying the previously determined contextual element and;

a request to allocate a new terminal identifier to be associated with its immutable physical address, where after sending the message, said the terminal can receive a new terminal identifier, and change its previous terminal identifier in its memory to a new terminal identifier received from the base station.

The terminal comprises means to implement the steps described below of the method of the invention which are performed by the said terminal.

BRIEF DESCRIPTION OF THE FIGURES

Other characteristics and advantages of the invention will be shown clearly on reading the detailed description below, with reference to the appended figures, which illustrate:

FIG. 1A: an allocation of lines for a set of terminals for incoming calls by means of a gateway of the prior art;

FIG. 1B: an allocation of lines for a set of terminals for outgoing calls by means of a gateway of the prior art;

FIG. 2: an allocation of lines for a set of profiles according to the method of the invention for incoming and/or outgoing calls;

DESCRIPTION

Figure 3:
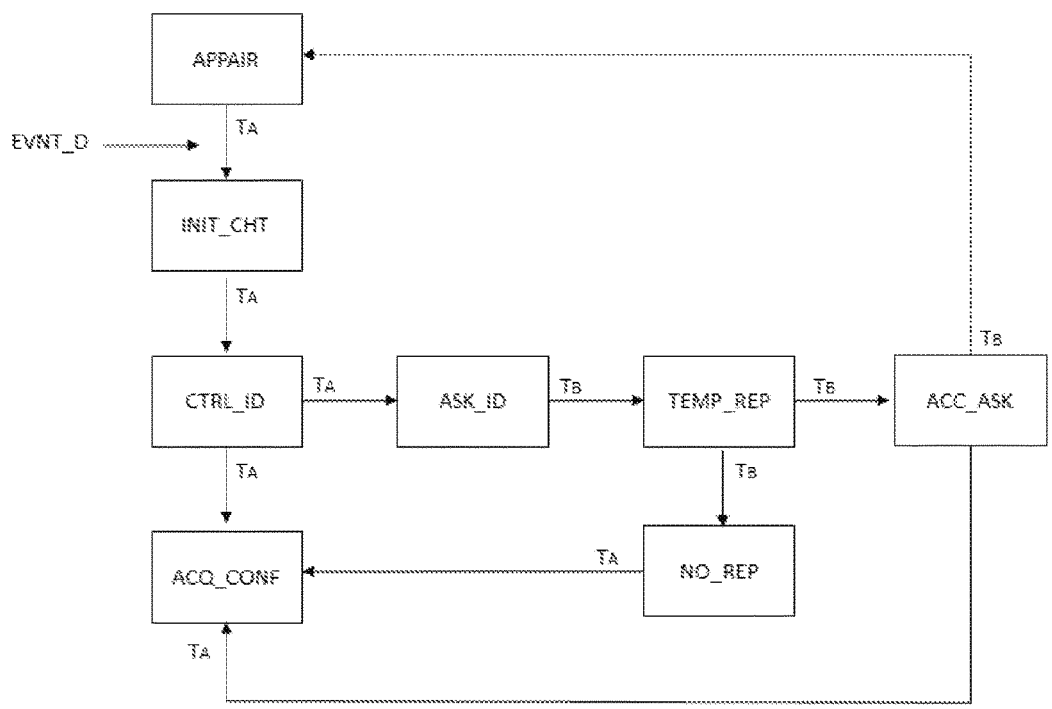
FIG. 3: the main steps of the method of the invention.

In the remainder of the description various implementations of the invention are described in detail. The method of the invention can be understood as a method for re-indexing a terminal in a base station, since a new identifier is allocated to this terminal under certain conditions. The method of the invention can also be understood as a method for reallocating a routing configuration for routing a terminal, since the consequence of the change of identifier is that the routing configuration also changes.

Definitions

Base Station

In the remainder of the description a base or base station is a communication device enabling, firstly, the radio interface to be created with a plurality of terminals and, secondly, communication interfaces to be created with a set of telephone lines. A base is also a communication gateway. A DECT base is an example of a base station of the invention. Use will be made indiscriminately of the terms "base station" or "base" in the present description of the invention.

A base comprises at least one computer and one memory, and a set of external interfaces enabling telephone lines to be managed for incoming and outgoing calls. A base also comprises one or more internal interface(s) to receive and send signals from and to the terminals. The internal interface can be a radio or Ethernet interface or another type of wired or wireless interface. In different implementations, a base can comprise a combination of internal and external interfaces meeting different standards or protocols allowing configurations which enable a plurality of terminals with connections of different kinds, such as data or voice connections, to be managed.

Terminal

A terminal is a device comprising means to establish communication with another device. It therefore necessarily comprises a communication interface. The invention relates more specifically to wireless terminals possessing a radio interface enabling them to make a connection with a base station BS, in particular to make communications with other terminals.

The communications can be made:

between terminals known to base station BS, which enables communications to be made in an internal network.

between a terminal known to base station BS and an external terminal which is not referenced in the base station, where the established communications are then made outside an internal network or between different internal networks connected by different base stations.

Base station BS therefore acts as a gateway to make incoming and outgoing calls between multiple terminals known to the base station BS and external terminals or terminals which are not known to the base station in question.

A terminal comprises a physical address, also called a MAC address. This address can also be an IPEI address in the case of the DECT standard. It is considered that this address is an immutable address, in the sense that it never changes over the whole period of its use. A terminal also comprises an identifier, called a TPUI, which enables routing associations with telephone lines in the base station to be defined. The TPUI is allocated to a terminal in particular during an operation called peering, i.e. when it is first connected to a base station BS. A first configuration of base station BS enables routing rules to be defined to route multiple terminals to which identifiers of TPUI terminals have been allocated. More generally, the TPUI is allocated after a "LOCATE REQUEST", which is generated each time a terminal discovers a base station, either simultaneously with a peering operation, or when it enters the coverage area of a base station.

Routing Rules

A base station BS comprises data stored in a memory which defines routing rules. The routing rules define the associations between the lines and the TPUIs of the terminals for incoming and outgoing calls.

According to one implementation, routing enables to logical line numbers to be associated with logical terminals. However, the routing rules enable digital or analog communications to be routed. When the communications are digital various protocols can be supported, such as the IP protocol, by base station BS. For example, voice communications over IP can be routed logically by a digital routing table.

The routing rules enable ringing settings to be generated, for example of a number of terminals associated with a line number, an incoming call of which has been detected by base station BS.

Dock

A dock is a device which, in particular, allows a terminal to be charged. A dock generally enables a main power source to be converted into a power source dedicated to the terminal. A dock of the invention also comprises a bracket to hold the terminal when it is connected to a dock. The dock and the terminal can therefore exchange electrical signals either to power the terminal or to communicate. According to one implementation of the invention, a dock and a terminal can exchange identifiers or data relating to their identities by means of generated signals passing through these devices' connection interfaces. The identifier of a dock is called IDS in the remainder of the description.

Context Identifier

Figures 1A, 1B, 2:
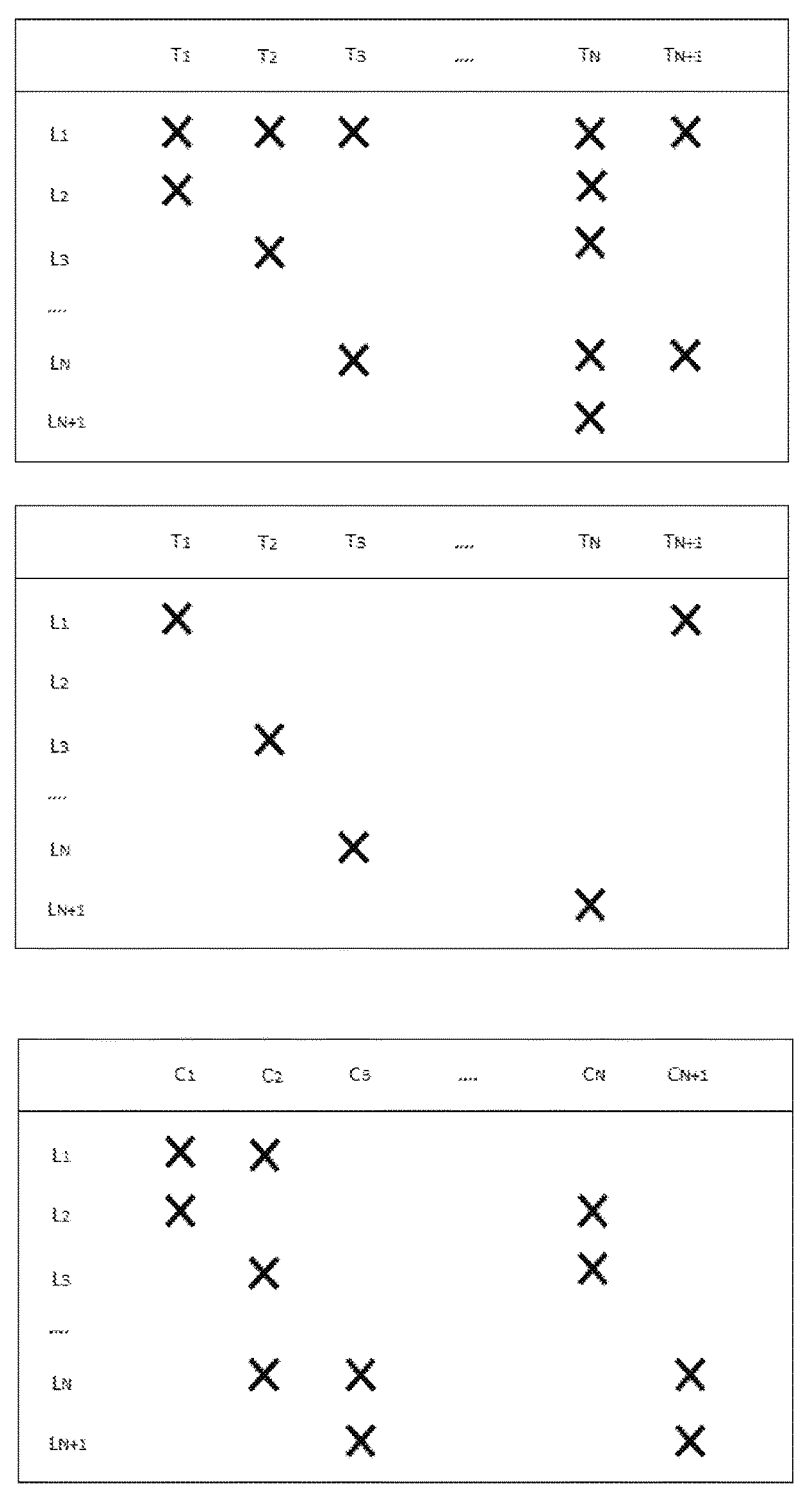

FIG. 2 represents a diagram for allocating lines to context identifiers $\{C_1\}_{i \in [1, N]}$ and, more generally, IDC when speaking of a context identifier. In the example of FIG. 2 context identifier $C_1$ is related to a user function Ui. In this example context identifier IC may be an identifier of a user's function.

According to various examples, a context may be defined by an employment position in a company, a business activity, a location such as a floor of a building, or an address, a user or any other element defining a context.

In one example, $C_1$ represents a default position, $C_2$ represents a position of secretary, $C_3$ represents a position of director, $C_N$ represents a laboratory position and $C_{N+1}$ represents a position attached to the director's office.

There are therefore default routing configurations and specific routing configurations.

Context identifiers are associated with routing configurations; contexts are therefore defined uniquely to prevent allocation errors.

One benefit of context identifiers is that it is no longer the case that each is necessarily attached to a named device allocated to a predefined user.

Synchronisation of a Terminal, Peering

When a terminal is synchronised with the base or the gateway, an identifier called TPUI is allocated by the base to the terminal. A peering procedure enables a first allocation of a TPUI identifier to a terminal in a base station to be recorded and configured. This procedure is performed prior to the method of the invention.

When the base allocates a TPUI identifier to a terminal, the base can then be configured according to the routing rules, to allocate with the terminal a set of lines allocated for incoming and outgoing calls.

Discovery of a Base

When a terminal is switched on and synchronised with its base station, it can transmit data to its base station BS in its nearby environment, for example by radio. To this end it can transmit signals comprising its terminal identifier TPUI. According to one implementation, the terminal can transmit additional data relating to its environment, such as a charge level, an identifier of the dock to which it is connected, or the dock identifier of the last dock to which it was connected.

Activating Event

According to one implementation, the activating event is the detection that contact has been made between a terminal and a given dock. In this implementation, the event is generated after a terminal is connected to a given dock which is not the terminal's reference dock with which it was initially associated. The terminal and the dock exchange electrical signals through a connector.

According to a first variant implementation, the dock is a smart device. A signal transmitted by the terminal to the dock comprises the terminal's identifier TPUI. In this case, the dock is then configured to send to base station BS, the terminal identifier TPUI received, for example, by radio or over a wired connection.

According to a second variant implementation, the terminal sends messages comprising context information to the base station. A signal transmitted by the dock to the terminal comprises a dock identifier IDS. This identifier IDS is then transmitted to base station BS by radio from the terminal. Dock identifier IDS or equivalent information identifying the dock enables base station BS to determine an associated context identifier. In this case, it is considered that dock identifier IDS is context information which in this case is the change of dock identifier IDS to which the terminal has been connected. The dock identifier can be associated with a function, as defined in FIG. 2.

In both variants base station BS is configured to receive either signals from a dock, or signals from a terminal. Terminal identifier TPUI transmitted by the dock and/or dock identifier IDS transmitted by the terminal to base station BS.

When the terminal is smart, it sends the change of the dock-terminal association to the base. When the terminal is not smart, it sends a dock identifier to base station BS. It is then base station BS which is configured to initiate a comparison with an already known association between the terminal and the dock. When a change of terminal-dock association is detected, a change of indexing of terminal identifier TPUI to a new communication context is begun.

More generally, there are two types of activating event: an event which is generated automatically according to a public context or a manual event activated by the action of a user who defines a private context. According to the last implementation, a context may comprise characteristics of a private context and of a public context.

An automatic event is caused by a change of public context. It may be, for example, the detection of the loading dock used (communication, angle of inclination, etc.), as described above. In other examples, the activating event may be the detection of the location of the terminal, or alternatively the automatic recognition of a user by means of characteristics such as a fingerprint, a face or a voice.

The detection of the change of contexts can, preferentially, be transmitted by the terminal to base station BS. In the latter case, the terminal sends a notification message to base station BS, such as an IWU-TO-IWU message, in which the message is defined in the ETSI standard which defines protocols for exchanging DECT messages. This latter message can be generated such that it comprises context information.

According to one implementation, when the terminal comprises data describing the allocations of each TPUI it can directly request the desired TPUI from the base. This request can be made by generating a request sent to the base station by radio.

According to another implementation, the change of context can be detected by a component other than the terminal in question. For example, when the dock is equipped with transmission means the request to change the TPUI identifier can be transmitted from this device. Other devices connected to the base may also upload contextual elements which triggers a reallocation of a TPUI to a terminal.

A manual event can be triggered by a user directly through the graphical interface of the gateway or the interface of a terminal. This event enables a private context to be defined. The users can identify themselves or identify a location. This identification, which may or may not be protected by a password (PIN code or other means) can be made from a terminal by entering a combination of particular tones, figures or characters. In this case, base station BS is informed of the change without requiring that an operator physically accesses base station BS, or using a dedicated management device. A change of allocation can then be started from a terminal.

According to another implementation, the manual activating event is the detection and transmission of a code entered by a user in an interface of a terminal, such as a PIN code. The said code is then transmitted by radio to base station BS. In this case, base station BS can associate the PIN code received with a context identifier IDC. Context identifier IDC identified by base station BS enables a check to be made whether the TPUI associated with this context identifier is or is not immediately available. The method of the invention enables this new terminal identifier TPUI to be reallocated to the terminal which sent the message containing the PIN code. After this new terminal identifier has been allocated, it is then re-indexed in a memory of base station BS.

According to one implementation, the context information comprises two combined elements of information such as, for example: a dock identifier newly associated with a terminal which was previously associated with another dock and a password such as a PIN code. This is a complex context defined by two criteria. This implementation prevents, for example, a third party simply connecting their terminal to the dock of another person in order to inherit the routing rules from them. Some contexts may therefore comprise the identification of a password sent to base station BS, combined with a public context.

A context identifier IDC may consequently be considered equivalent to a dock identifier, a user identifier, a location identifier or alternatively an identifier of an employment position, if the position is unique, such as, for example, that of director. When describing the invention's implementations, these various identifiers are called context identifiers or IDCs.

Allocation of the TPUIs

According to one implementation, the allocations between the terminal identifiers and the line identifiers are recorded in a memory of base station BS, for example in a database. According to one implementation, the database comprises a table comprising the terminal identifications TPUI. According to one example implementation, the TPUIs are defined using 8 bits. In this case, 255 devices can be indexed in the table.

According to one implementation, the database indexes a number N of terminal identifiers TPUI with a predefined allocation. A TPUI can be allocated to a user in particular, one employment position or one location, etc., where the use of the terminal defines this allocation. The operation to allocate a terminal comprises the association of a specific routing configuration with a TPUI of the said terminal.

In this same table, a number P of identifiers are not allocated to a specific routing configuration, or are awaiting such allocation; they are said to be "free". They may have a default routing configuration. The set of identifiers P can be used for free terminals. In other words, a free TPUI is a TPUI which is not associated with a context identifier. Consequently, a terminal with a free TPUI will use a line association defined by default in base station BS.

In addition, when a new terminal is discovered by base station BS, for example during a peering procedure, an unallocated terminal identifier TPUI can be used. If a routing configuration is defined for this terminal its TPUI will then be allocated to this configuration; otherwise it will be in a default configuration.

Re-Indexing of the TPUIs

The method of the invention enables the table of TPUIs to be re-indexed when an activating event is detected by the base. The operation to re-index the table comprises changing a TPUI of a terminal in order to reallocate a new routing context to the terminal in question. The activating event comprises data, called the context information, enabling a new TPUI to be allocated to the terminal.

For example, when a terminal is connected to a new dock, the dock sends the terminal a unique identifier which enables the terminal's new TPUI to be determined.

According to another example, when a user enters a PIN code or an equivalent user identification code, this code enables the terminal's new TPUI to be determined.

This flexibility allows new uses of mobile terminals, for example in offices. Terminals can be interchanged or lent, whilst having a routing configuration specific to the user of the terminal.

The method may comprise a single operation to re-index a TPUI when a single activating event is detected, or a plurality of re-indexing operations when various concomitant activating events occur within a given time period.

In order to perform the method of the invention the database of base station BS may comprise a second table indexing dock identifiers IDS to the routing table. A third table indexing user codes IDUs to the routing table may be also used. Any of these tables enables a context identifier to be associated with a particular routing configuration. The method of the invention thus enables a new set of identifiers, called context identifiers IDC, to be used in order to recognise the routing configuration with which a terminal which has changed context is associated, where this change of context may be a change of location, a change of dock or a change of employment position or of user.

Steps of the Method

FIG. 3 represents the main steps of the method of the invention, in which a step of peering APPAIR of a terminal $T_A$ has previously been represented. During a peering procedure for a terminal $T_A$ the base allocates a free TPUI identifier to the said terminal. In this case, a default routing configuration is allocated to terminal $T_A$.

The step of peering has been represented since the method of the invention advantageously enables benefit to be derived from steps which normally follow a peering request, but which are performed in this case in connection with a procedure to reallocate a TPUI of a terminal. One feature of this reallocation is that it is performed automatically when a predefined activating event occurs.

The peering step may also result in a non-free TPUI which already has an association with a particular routing configuration being allocated.

The re-indexing method of the invention applies to a terminal with a TPUI which has a default allocation or a particular allocation. When a terminal has no allocation, and when it is first connected to a base station BS, a default routing configuration is associated with it.

The method of the invention comprises the detection of an activating event EVNT_D by the base. The activating event is generated by an action performed on terminal $T_A$.

The detected activating event is interpreted by the base station as an automatic request to reallocate a TPUI to the said terminal. Actually, the activating event enables a check to be made that a terminal is being used in a given context when next used by a user.

The method of the invention comprises the initialisation of a change of allocation after the request to reallocate a TPUI of terminal $T_A$ has been validated. The request is analysed by base station BS on the basis of a context identifier IDC which is determined in light of the received context information. Context identifier IDC can be a code or alternatively a dock identifier.

Base station BS then analyses whether context identifier IDC is associated with a free TPUI, or one which has already been allocated to another terminal. This analysis may be undertaken using the table of context identifiers; this step is noted CTRLJD in FIG. 3.

If TPUI_1 associated with context identifier IDC is available, the TPUI_1 in question is automatically allocated to terminal $T_A$, which receives new terminal identifier TPUI_1. In this case, terminal $T_A$ is automatically associated with a predefined routing configuration for context identifier IDC. This step of acquisition of a routing configuration is noted ACQ_CONF in FIG. 3. This step is given embodied by the reception and recording of the TPUI_1 within the terminal, and by its re-indexing in the database of base station BS.

If the TPUI_1 associated with the context identifier is unavailable, base station BS sends a request ASK_ID to terminal $T_B$ with the unavailable TPUI which has already been allocated to it.

Terminal $T_B$ with the desired TPUI_1 then releases it by switching to a free TPUI identifier. This release may be performed using one of two processes, depending on whether or not terminal $T_B$ is accessible from the base station.

When base station BS contacts terminal $T_B$, for example by means of a request, a time delay TEMP_2 is started, enabling a time window to be defined in which the response of terminal $T_B$ will or will not be received.

When terminal $T_B$ does not respond within the allowed time window TEMP_2, step NO_REP in FIG. 3, it is then considered to be out of range of base station BS, and terminal $T_A$ is given the desired identifier. When terminal $T_B$ next connects, it must ask the base station to allocate a new TPUI.

When terminal $T_B$ is "seen" by the base station, i.e. it is able to respond to a request of the base station, then the method of the invention comprises the generation of a response ACC_ASK which may result in:

the acceptance of the request for a new TPUI for terminal $T_A$, the allocation of the new TPUI_1 and the allocation of the new particular routing configuration ACQ_CONF and;

the request for a new TPUI for terminal $T_B$, either by a new peering process, or by allocating a new free terminal identifier.

The method allocates the desired TPUI_1 to terminal $T_A$, which inherits the particular routing configuration which was previously that of terminal $T_B$, and which is newly reallocated to terminal $T_A$. Terminal $T_B$ then obtains a free TPUI identifier and a default routing configuration associated with this new TPUI.

Implementations with or without Time Delay

Figure 4A:
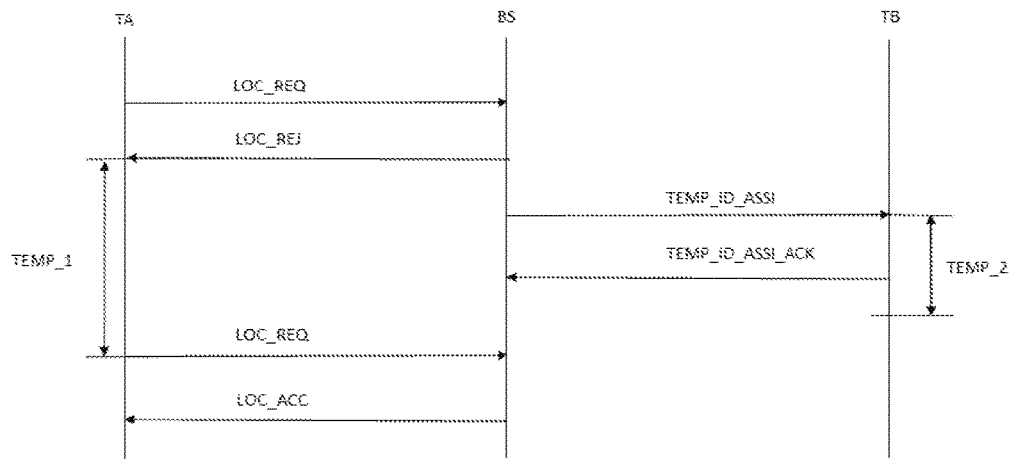
FIG. 4A: a first implementation of a sequence of transmission and reception of data, leading to a re-indexing of a terminal in a base station according to the method of the invention.
Figure 4B:
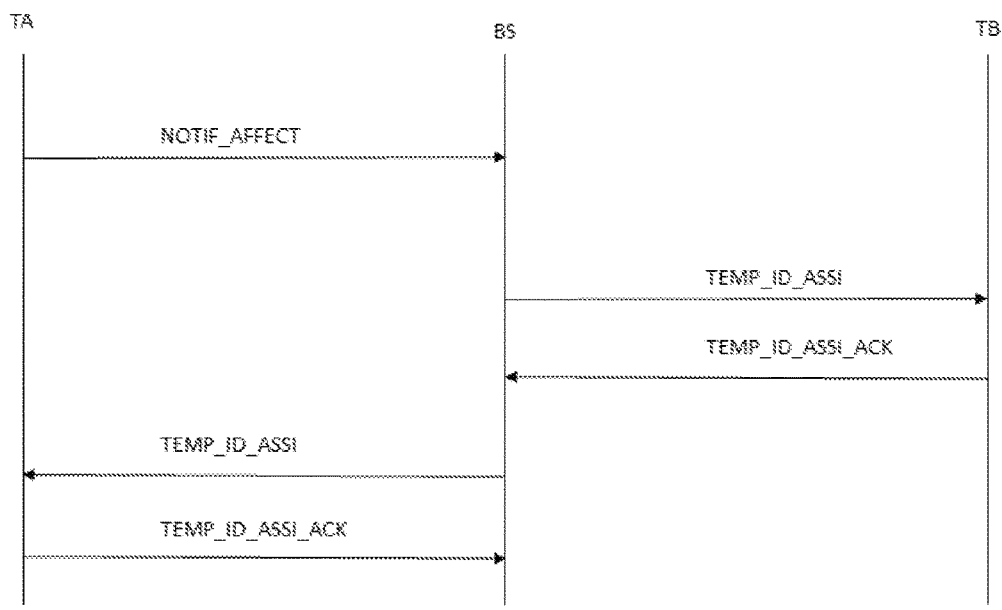
FIG. 4B: a second implementation of a sequence of transmission and reception of data leading to re-indexing of a terminal in a base station according to the method of the invention.

FIGS. 4A and 4B represent two variant implementations of the method of the invention. In a first variant, represented in FIG. 4A, the re-indexing method is started, for example, by terminal $T_A$. In the second variant, represented in FIG. 4B, the re-indexing method is started, for example, by base station BS. However, a request is always sent by the terminal to the base, since the request is the consequence of an action by a user or is generated automatically.

In FIG. 4A, terminal $T_A$ sends a request LOC_REQ to base station BS following the occurrence of an activating event. Request LOC_REQ comprises data providing informing about the change of context, or directly stating the identifier of the desired TPUI. According to one implementation, request LOC_REQ comprises a simple request "LOCATE_REQUEST" indicating the signing of the request, and a dedicated "IWU_TO_IWU" message comprising the context information, or directly stating the requested TPUI. The data indicating the change of context may comprise a context identifier when it is known to the terminal, or information relating to a change of context which will be analysed by base station BS to determine the context identifier relating to this context information. For example, when the context information is a dock identifier which is not associated with the terminal to which it has just been connected, or to which it is connected, the context identifier may correspond to the identifier of a user who has received the dock. It may also be a code entered by a user, as previously described, or alternatively a combination of a private context and a public context.

On receiving the request made by the terminal, base station BS checks whether or not the desired TPUI or the TPUI associated with the context information is available. If the TPUI is available, base station BS sends a response noted LOC_ACC. The response then comprises the new identifier TPUI, and the terminal then updates its terminal identifier, and saves it in a memory of the terminal.

According to one implementation, base station BS sends a refusal response LOC_REJ to terminal $T_A$, comprising a time delay TEMP_1, asking terminal $T_A$ to resend its request later, after a predefined time period has elapsed.

This time delay enables, for example, the availability of the TPUI to be checked. When the TPUI is already allocated to another terminal, the time delay also enables the allocation of the TPUI of the terminal which already has the desired TPUI to be changed, in order to make it available. On receipt of this response, terminal $T_A$ will resend its request at the end of a first given period. According to one implementation, the first given period is indicated in response message LOC_REJ of base station BS to terminal $T_A$. According to another implementation, the first given period is predefined in each terminal.

After it has identified the context identifier relative to the request of terminal $T_A$ base station BS is able to determine the terminal identifier TPUI which is associated with this context identifier. The above time delay enables base station BS to send a request to change the TPUI to the terminal with the desired TPUI. This terminal is noted $T_B$ in FIG. 4A and the request to change the TPUI to terminal $T_B$ is noted TEMP_ID_ASSI in FIG. 4A and FIG. 4B.

If base station BS receives no response from terminal $T_B$ over a predefined time period TEMP_2 corresponding to a second maximum time period, terminal $T_B$ is considered by base station BS to be out of range or switched off. The TPUI of terminal $T_B$ is then allocated to terminal $T_A$ in the response LOC_ACC sent by base station BS after first given period TEMP_1 has elapsed. When it next connects to base station BS, terminal $T_B$ will restart a peering procedure to obtain a new TPUI matching its context.

If the base station receives a response from terminal $T_B$ by message TEMP_ID_ASSI_ACK of FIG. 4A within time period TEMP_2, then base station base BS reallocates the TPUI of terminal $T_B$ to terminal $T_A$, and will reallocate a free TPUI to terminal $T_B$, i.e. a TPUI which is not associated with a context identifier.

First period TEMP_1 is configured to be longer than second period TEMP_2, such that base station BS may obtain a response from terminal $T_B$ before the end of first period TEMP_1. According to one example implementation, first period TEMP_1 and second period TEMP_2 may be set at between several milliseconds and several seconds.

FIG. 4B represents a second implementation, in which the method of the invention is started by base station BS, and in which the terminal is not then subject to a time delay to resend its change request NOTIF_AFFECT. In this implementation the re-indexing method is faster than the method of FIG. 4A.

In this implementation the messages exchanged between terminal $T_A$ and the base comprise no time delay. A message NOTIF_AFFECT sent by terminal $T_A$ comprising the request to change TPUI and the context information is received by base station BS. On receipt of the request of terminal $T_A$ base station BS checks the availability of the TPUI associated with the context information sent by terminal $T_A$. If the associated TPUI is free it is sent by message TEMP_ID_ASSI. The terminal can then change its TPUI by recording it in a memory. Terminal $T_A$ resends a change confirmation request noted TEMP_ID_ASSI_ACK, informing the server that the new allocation has been applied.

When the TPUI associated with the context information is not available base station BS sends a message to the terminal at the address of the TPUI, seeking to allocate a new free terminal identifier to it, in order to allocate the TPUI associated with the context information to terminal $T_A$.

Advantages

A first advantage of the re-indexing method of the invention is to enable a set of users of multiple terminals to exchange the terminals attached to a single base station, to prevent losses of terminals, and to prevent reallocation of them in the base station requiring the intervention of a technician.

The invention thus enables flexible allocations of the terminals to be reconfigured, allowing ad hoc operation within a set of users.

The invention also enables management of the terminals to be simplified, by abstracting the allocations of each user to a given device.

Another advantage is that it allows dynamic reconfiguration which is entirely managed by message exchanges between the terminals and the base station.

Finally, one advantage is that it allows adaptability to the data exchange protocols between terminals and the base station previously established by standards, in particular standards relating to DECT.

The invention enables dynamic terminal allocations to be made secure, since these allocations are compatible with the use of passwords when identifying a context, leading to a change of terminal allocation.

The invention claimed is:

1. A method for re-indexing in a base station at least one first mobile terminal which is to be associated with a new predefined routing configuration, wherein the base station lists a first set of identifiers of mobile terminals and a set of context identifiers, wherein each context identifier is associated with an allocation of lines corresponding to a routing configuration for routing incoming and outgoing communications, the method comprising:

detecting a request to change a terminal's identifier, sent by the first terminal, wherein the request comprises information corresponding to a context identifier listed in the base station and wherein the sending of the request by the first terminal has been caused by an activating event generated, wherein the activating event has been caused by the detection of a change of context of the first terminal;

checking that a new terminal identifier associated with the context identifier is available, wherein the context identifier is determined by analysing the context information contained in the request;

allocating a new terminal identifier to the first terminal, the allocating comprising:

sending the new terminal identifier to the first terminal;

changing the indexing of the new identifier of the terminal stored in the base station.

2. The re-indexing method according to claim 1, wherein the base station comprises a memory in which a set of specific routing configurations and at least one default routing configuration are stored.

3. The re-indexing method according to claim 2, wherein, when the step of checking the availability of a new terminal identifier fails, the method comprises:

generating a request to modify the terminal identification sent to a second terminal, comprising the terminal identification corresponding to the desired context identification;

allocating a second terminal identifier to the second terminal, wherein the second terminal identifier is allocated to a default routing configuration.

4. The re-indexing method according to claim 3, further comprising sending of a message by the base station to the first terminal, asking it to send a new request to change the terminal identifier after a first time period has elapsed.

5. The re-indexing method according to claim 2, wherein, when the step of checking the availability of a new terminal identifier fails, the method comprises:

generating a request to modify the terminal identification sent to a second terminal, comprising the terminal identification corresponding to the desired context identification;

activating a second time delay, during which the base station waits for a reply from the second terminal;

deleting the terminal identification of a second terminal comprising the terminal identification corresponding to the desired context identification in an indexing table of the base station after the second time delay has elapsed.

6. The re-indexing method according to claim 1, wherein the context information is one element in the following list: —a dock identifier, when the activating event is a connection of the first terminal to a dock other than the dock with which it has initially been associated; —a user identifier or a code associated with a user account, when the activating event is the entry of a code in an interface of the first terminal or the recognition of a fingerprint; —a location identifier, when the activating event is the association of the first terminal with a predefined location, known to the base station.

7. A non-transitory computer program product comprising a computer and a memory, comprising instructions which, when the program is executed by a computer, cause the computer to implement the steps of the method according to claim 1.

8. A non-transitory computer-readable recording medium comprising instructions for implementing the steps of the method according to claim 1.

9. A base station comprising means for computing communications interfaces enabling incoming calls to be received and transmitted, a radio interface enabling messages to be sent to and received from multiple terminals referenced in a memory, wherein the memory stores data referencing:

mobile terminal identifiers associated with context identifiers;

line identifiers enabling routing configurations to be defined when they are associated with terminals, wherein the base station comprises a configuration table for the routing of incoming and outgoing calls associating each context identifier with a predefined routing configuration, wherein the base station also comprises a function enabling a request to change a terminal identifier which has been sent by a terminal to be detected, wherein the sending of the request by the first terminal has been caused by an activating event generated, wherein the activating event has been caused by the detection of a change of context of the first terminal, a determination of context information comprised in the request enabling a new terminal identifier associated with a context identifier corresponding to the information extracted from the received message to be identified, and an allocation of the new terminal identifier to the terminal which made the request for change.

10. A terminal comprising an immutable physical address and an interface enabling a contextual element relating to a new use of the terminal to be determined, and computation means enabling a message intended to be sent to a base station transmitted by radio to be generated, wherein the message comprises:

information identifying the previously determined contextual element and;

a request to allocate a new terminal identifier to be associated with its immutable physical address, wherein the sending of the message by the terminal is caused by an activating event generated, wherein the activating event is caused by the detection of a change of context of the first terminal, and wherein, after sending the message, said terminal can receive a new terminal identifier, and change its previous terminal identifier in its memory to a new terminal identifier received from the base station.

* * * * *